(12) United States Patent
Ezrielev et al.

(10) Patent No.: US 12,493,414 B2
(45) Date of Patent: Dec. 9, 2025

(54) REDISTRIBUTION OF DISKS BASED ON DISK WEAR PATTERNS

(71) Applicant: Dell Products L.P., Round Rock, TX (US)

(72) Inventors: Ofir Ezrielev, Be'er Sheba (IL); Jehuda Shemer, Kfar Saba (IL); Amihai Savir, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/046,652

(22) Filed: Oct. 14, 2022

(65) Prior Publication Data

US 2024/0126451 A1    Apr. 18, 2024

(51) Int. Cl.
*G06F 3/06* (2006.01)

(52) U.S. Cl.
CPC .......... *G06F 3/0619* (2013.01); *G06F 3/0604* (2013.01); *G06F 3/0653* (2013.01); *G06F 3/0683* (2013.01)

(58) Field of Classification Search
CPC .... G06F 3/0619; G06F 3/0604; G06F 3/0653; G06F 3/0683
See application file for complete search history.

(56) References Cited

U.S. PATENT DOCUMENTS

| | | |
|---|---|---|
| 9,250,823 B1 | 2/2016 | Kamat et al. |
| 10,082,965 B1 | 9/2018 | Tamilarasan et al. |
| 10,146,459 B1 * | 12/2018 | Gao ............... G06F 3/0619 |
| 11,262,918 B1 * | 3/2022 | Venugopal ........... G06F 3/0616 |
| 2009/0144568 A1 * | 6/2009 | Fung ................ G06F 1/324 |
| | | 713/300 |
| 2014/0095826 A1 | 4/2014 | Rajagopal et al. |
| 2014/0317444 A1 | 10/2014 | Kushihara et al. |
| 2017/0285943 A1 * | 10/2017 | Dalmatov ........... G06F 12/0246 |
| 2020/0133753 A1 | 4/2020 | Olson et al. |
| 2020/0133801 A1 * | 4/2020 | Srinivasan ........... G06F 3/0665 |
| 2021/0149777 A1 | 5/2021 | Gao et al. |
| 2021/0286535 A1 * | 9/2021 | Aldred ............... G06F 11/3442 |
| 2021/0334030 A1 * | 10/2021 | Yang ................ G06F 3/067 |
| 2023/0008978 A1 * | 1/2023 | Puvvada ........... G06F 11/2097 |

* cited by examiner

*Primary Examiner* — Nanci N Wong
(74) *Attorney, Agent, or Firm* — Workman Nydegger

(57) ABSTRACT

Redistributing disks based on disk wear patterns is disclosed. The wear patterns of disk drives in a storage system are learned or determined. When a restore operation is performed, the volumes to disk drive mappings are changed to balance the overall wear pattern of the storage system. This insures that, after the restore operation, disks that had comparatively lower wear levels are used more heavily while disks that had comparatively higher wear levels are used less heavily.

11 Claims, 5 Drawing Sheets

REDISTRIBUTION OF DISKS BASED ON DISK WEAR PATTERNS

FIELD OF THE INVENTION

Embodiments of the present invention generally relate to data protection systems and operations. More particularly, at least some embodiments of the invention relate to systems, hardware, software, computer-readable media, and methods for storing data in storage devices to balance wear patterns.

BACKGROUND

Data can become corrupted for multiple reasons. Data can be corrupted, for example, due to malicious reasons such as cyber-attacks. Data may also become corrupted for non-malicious reasons. Drive failures or other technical issues may result in corrupted or lost data.

This problem is partially addressed by creating backups of data. Backups allow corrupted production data to be restored in the event of corruption of loss. Backups, however, may be insufficient to fully protect the data. More specifically, backups protect the data, but do not specifically address the health of the storage system itself or the health of the disk drives.

For example, the life of a disk drive can often be described in terms of writes. Once a disk drive has been written to a certain number of times or once a certain amount of data has been written to the disk drive, there may be a presumption that the disk drive may fail in the near future. In other words, the viability of the disk drive is in question.

When a storage system includes multiple disk drives, the wear, which is a way of expressing the useful remaining life, of each disk drive is typically different because of the manner in which the disk drives have been used. For example, some of the disk drives may be more heavily used than other disk drives. This may lead to premature failure of the storage system as a whole even though several of the disk drives have comparatively less wear, and thus more life.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to data protection systems and operations. More particularly, at least some embodiments of the invention relate to systems, hardware, software, computer-readable media, and methods for redistributing disks or writes based on disk wear patterns.

Wear level of disk drives may be measured using metrics such as drive writes per day (DWPD), or terabytes written (TBW). The metrics, however, are distinct from the capacity of the disk. For example, data could be written to the same location on a particular disk. Over time, the TBW metric or DWPD metric may suggest that the wear level is high even though much of the disk has never experienced a write or has experienced comparatively lower writes in this example. In any event, disks with high wear levels may have limited remaining life.

A storage system may include multiple disk drives that may provide storage for multiple applications. Different applications may write to different disk drives in the storage system. As a result, each of the disk drives in the storage system may have been associated with different write patterns and have, as a result, different wear levels.

Embodiments of the invention relate to a restore operation that accounts for these wear patterns. More specifically, a data production system may be configured to learn or determine wear patterns of disk drives or to learn how the writes are distributed to the disk drives. Stated differently, the wear patterns may correspond to write patterns of various applications using the disk drives in the storage system.

To help balance the wear levels of the disk drives in the storage system, the restore operation may include a mapping operation to generate a new mapping function. This allows applications associated with heavier wear patterns to write to disk drives that have comparatively less wear. In other words, the restore operation may restore an application or the application's data to different disk drives. This allows the restore operation to balance the drive wear across all disk drives in the storage system.

Figure 1:
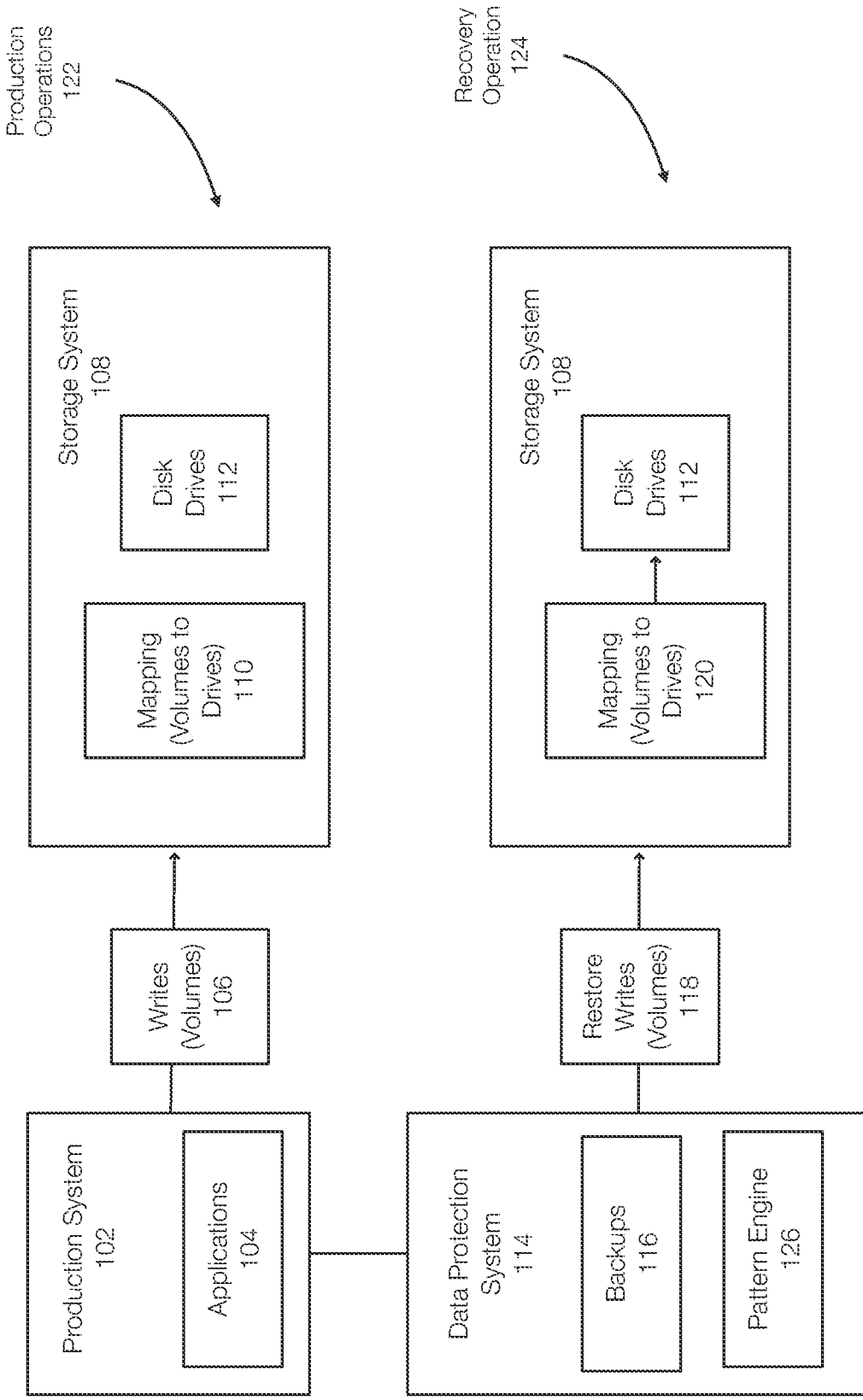
FIG. 1 discloses aspects of a production system and a data protection system configured to manage a lifetime of a storage system.

FIG. 1 discloses aspects of a recovery operation that accounts for drive wear patterns. FIG. 1 illustrates a production system 102 that is associated with a storage system 108. During normal operation of the production system 102, applications 104 may generate writes 106 that are typically directed to specific volumes. The storage system 110 include disk drives 112 and a mapping 110 that maps volumes to disk drives. A volume, for example, may include or span less than an entire drive to one or more drives. For example, the storage system 108 may support 6 volumes that are mapped to 24 disk drives.

As the applications 104 generate the writes 106 during production operations 122, the writes 106 may have a write pattern where some of the drives experience more writes than other drives. This results in a sub-optimal wear pattern in the storage system.

A data protection system 114 may generate backups 116 of the production system 102. If the backups are volume/application based, the backups 116 includes a backup for each volume/application supported by the storage system 108. The backups 116 could be disk based as well and the data protection system may ensure that all disks of a particular volume or application are protected at the same time in one example for consistency.

During a recovery operation 124, the data protection system may restore the backups 116 to the storage system 108. In one example, a pattern engine 126 may be configured to learn a wear pattern of the storage system 108. The wear pattern may be learned as the production system operates by tracking writes and/or amount of data written to each of the disk drives 112 or to the volumes. Metrics such as drive writes per day or terabytes written may be used to measure or estimate the wear of each disk drive in the storage system 108. Example metrics include SMART (Self-Monitoring, Analysis and Reporting Technology) is an example of a monitoring system that may be included in hard disk drives and solid disk drives. SMART attributes, which are incorporated herein by reference, such as but not limited to, read error rate, throughput performance, spin-up time, start/stop count, reallocated sectors count, seek error rate, seek performance, power-on hours, and the like are examples of metrics that may be used to estimate the wear of each disk drive in the storage system 108.

Alternatively, the wear pattern may be quickly computed using these or other metrics when the recovery operation is initiated. The recovery operation 124 considers the wear pattern associated or produced by the production operations 122 and generates a new or adjusted mapping 120, which is different from the mapping 110. The new mappings 120 change the manner in which the disk drives 112 are used and thus changes the wear pattern for subsequent writes. Advantageously, changing the mapping 120 allows the wear pattern of the storage system 108 to be more balanced over time. Stated differently, the mapping 120 causes writes previously directed to a first set of disk drives to be directed to a different set of disk drives. Over time, this balances the wear pattern across all disk drives in the storage system 108.

During the restore operation, the restore writes 118 are written to the disk drives 112 of the storage system 108 based on the new or revised mapping 120. After the recovery operation 124 and when the production operations 122 resume, the writes 106 will be directed to the disk drives 112 based on the new or adjusted mapping 120.

Figure 2A:
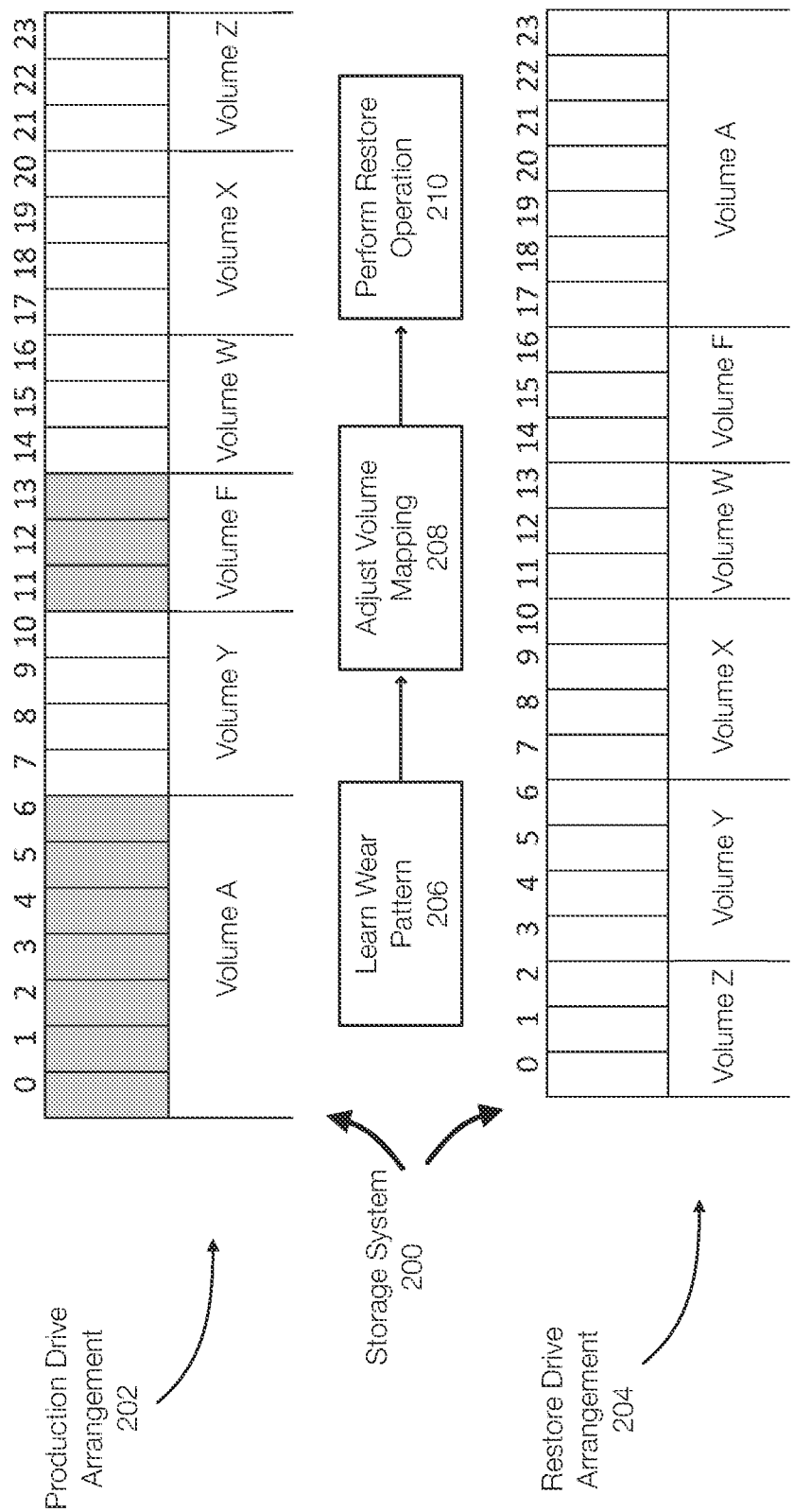
FIG. 2A discloses aspects of performing a restore operation based on the wear or expected remaining life of a storage system's disk drives.

FIG. 2A discloses aspects of data recovery operations including restore operations that perform a wear-based redistribution operation. FIG. 2A illustrates a storage system 200 that includes, by way of example only, 24 disk drives, which are numbered disk0-disk23. The production drive arrangement 202 illustrates a mapping between volumes and disk drives. Thus, volume A is mapped from disk0-disk6, volume Y is mapped from disk7-disk10, volume F is mapped from disk11-disk13, volume W is mapped from disk14-disk16, volume X is mapped from disk17-disk20, and volume Z is mapped from disk21-disk23.

For example, an application may be associated with a volume A. As a result, writes to the volume A, based on the mapping, are written to disk0-disk6.

More generally, applications writing to the storage system 202, as illustrated by the production drive arrangement 202, have a write pattern that results in more wear to the disk drives associated with volumes A and F. The other volumes Y, W, X and Z have comparatively less wear in this example.

When a restore operation is performed, the data protection system may learn 206 the wear pattern of the disk drives in the storage system 200. Learning 206 the wear pattern may be performed during production operations. This may include tracking drive writes per day, or terabytes written for each disk drive. By tracking these metrics, or other metrics, the data protection system can learn 206 the wear pattern across the disk drives of the storage system 200. Alternatively, the data protection system may track metrics on a volume basis because volumes may be mapped to specific disk drives. It may be assumed that the wear level of disk drives in a volume correlate to the wear levels of the volumes.

Once the wear pattern is learned or estimated, the data protection system may generate a new volume mapping or adjust 208 a volume mapping prior to performing a restore operation or as part of the restore operation.

In one example, adjusting 208 the volume mapping may include mapping volumes associated with heavy wear patterns or wear levels to disks that have comparatively less or smaller wear levels. Although the volumes in FIG. 2A are illustrated as including contiguous disk drives, volumes can be mapped to any disk drive configuration.

In this example, the new or adjusted volume mapping is illustrated in the restore drive arrangement 204. In this example, the mapping of volume A is changed from disk0-disk6 to disk17-disk23. The mappings of other volumes are illustrated in FIG. 2A. More specifically, the mapping of volume F is changed from disk11-disk13 to disk14-disk16. The mappings of volumes Y, W, X and Z are similarly changed.

As illustrated in FIG. 2A by the shading, the disk drives 0-7, and 11-13 have experienced heavier wear compared to the disk drives 7-11, and 14-23. Thus, the mappings of these volumes are changed to disk drives that have experienced less wear.

Once the adjusted mapping is generated 208, the restore operation is performed 210. The data protection or restore operation may change mappings that may be present in the backup to correspond to the new mapping such that data previously stored and backed up from the disk drives 0-6 are restored to disk drives 17-23. The disk drives may or may not have identical characteristics and capacity.

When the production operation resumes, applications will still write to the same volumes as before. However, due to the new or adjusted mapping generated by the data protection system, the writes will be directed to different disk drives in the storage system.

Because the disk drives of a storage system may not have equal wear, embodiments of the invention configure a restore operation to rebalance or adjust the wear pattern. This is primarily achieved by remapping volumes to disk drives.

Figure 2B:
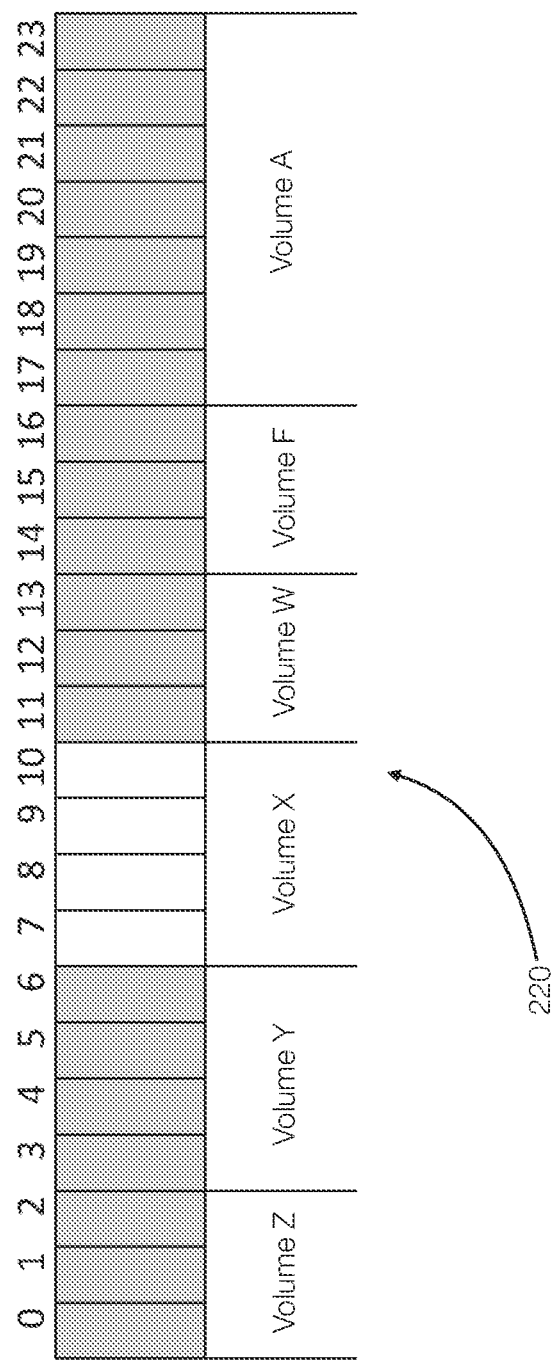
FIG. 2B illustrates an example of a wear pattern some time after a restore operation.

FIG. 2B discloses aspects of a wear pattern of disk drives in the storage system some time after the restore operation. As illustrated, the wear pattern 220 is more balanced compared to the wear pattern illustrated by the production drive arrangement 202 in FIG. 2A. By redistributing disks based on the wear pattern, the life of the storage system can be used more efficiently, and the disks can be made to experience wear in a more even and balanced manner.

Figure 3:
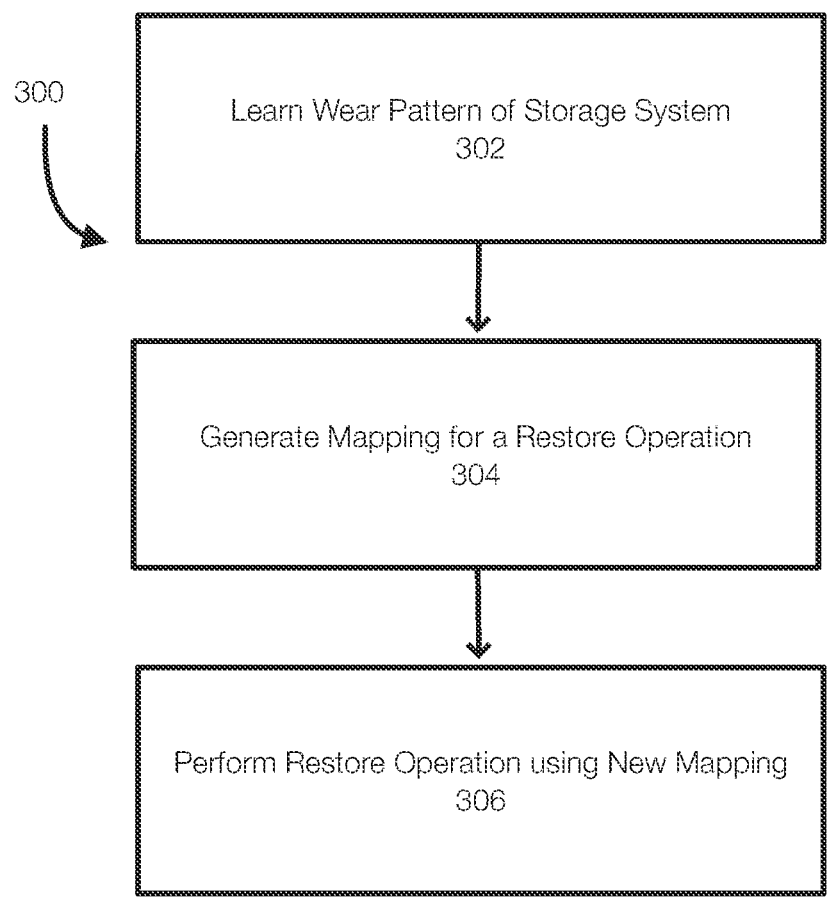
FIG. 3 discloses aspects of a restore operation that accounts for disk drive wear.

FIG. 3 discloses aspects of a restore operation. The method 300 begins by acquiring or learning 302 a wear patterns of disk drives in a storage system. The wear pattern can be learned by monitoring how may writes are written to each disk drive or by monitoring the size of the writes such that the wear is based on the amount of data written rather than the number of writes. In some examples, the wear pattern may be tracked on a volume basis rather than a disk drive basis or in another manner.

The wear pattern (e.g., write metrics) may be tracked over time by the production system or by a data protection system. Alternatively, these metrics may be stored such that the wear pattern can be determined by simply reading the metrics. By reading the metrics to ascertain the wear pattern or by learning the wear pattern, each disk drive in the storage system (e.g., a storage array) can be assigned a wear level or a wear score. Disk drives that have experienced more writes or that have had larger amounts of data written thereto may be given a higher wear level or score. In one example, these metrics can be used to give a wear score to each of the disk drives. The wear scores may be normalized across the storage array.

Once the wear pattern is learned 302, which may include determining the wear scores for the disk drives, a new mapping is generated 304 for a restore operation. As previously stated, an application may store data in a volume that is mapped to specific disk drives in the storage system. In effect, each of the applications writes to a specific disk drive or to a specific set of disk drives. Variances in write requirements among the applications leads to the wear patterns discussed herein.

However, because an application writes to a volume, the process of generating 304 a new mapping may consider the wear score of volumes or the wear scores of multiple disk drives. The wear score of a volume may be determined by simply adding the individual wear scores of the drives in the volume. When generating the mapping, the volume with the highest volume wear score may be assigned to a set of volumes that has the lowest volume wear score. In one example, new volumes may be created, or the existing volumes may be reconfigured.

In one example, the disk drives may be grouped in different manners in order to determine a grouping with the lowest volume wear score. The groupings may depend on whether or not the disk drives in a volume are required to be contiguous. If no such requirement is present, the disk drives with the lowest individual wear scores may be mapped to the volume being remapped. One advantage or objective of generating 304 the new mapping is to balance the wear across all of the disk drives over time. As illustrated in FIG. 2A, the mapping of volume A is changed from disk drives with high wear scores to disk drives with comparatively lower wear scores.

After the new mapping is generated 304, the restore operation is performed 306 using the new mapping. This may include making adjustments to the backup such that the data is directed to the proper disk drive.

The remapping is an example of redistributing disks based on wear patterns. Although embodiments of the invention are discussed in the context of a restore operation, it may be possible to redistribute the disks outside of a restore operation such that the wear pattern can be balanced without having to perform a restore operation. In one example, the system may be stunned such that this operation may be performed.

In another example, a storage system may include a production volume and a replicated volume. The replicated volume, however, is updated at a lower frequency than the production volume. Writes may be replicated on a daily basis, for example. Because data on the production volume may be rewritten many times during a day, this indicates that the wear pattern of the production volume is heavier than the wear pattern of the replicated volume. At some point, to balance the wear, production could shift to the replicated volume to become the production volume and the production volume would become the replicated volume. This may alleviate delays introduced by stunning the system.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful. At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general, however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines, containers, or virtual machines (VM), though no particular component implementation is required for any embodiment As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

It is noted that any of the disclosed processes, operations, methods, and/or any portion of any of these, may be performed in response to, as a result of, and/or, based upon, the performance of any preceding process(es), methods, and/or operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method comprising: determining a wear pattern associated with disk drives of a storage system, generating a new mapping for the disk drives, wherein the new mapping is configured to balance the wear pattern across all the disk drives of the storage system, and performing a restore operation based on the new mapping.

Embodiment 2. The method of embodiment 1, further comprising determining the wear pattern for each of the disk drives based on a total number of writes and/or a total amount of data written and/or one or more SMART metrics.

Embodiment 3. The method of embodiment 1 and/or 2, further comprising determining a wear score for each of the disk drives based on the corresponding wear pattern.

Embodiment 4. The method of embodiment 1, 2, and/or 3, further comprising generating the new mapping based on the wear scores of the disk drives.

Embodiment 5. The method of embodiment 1, 2, 3, and/or 4, wherein volumes mapped to disk drives with comparatively high wear scores are mapped in the new mapping to disk drives with comparatively low wear scores.

Embodiment 6. The method of embodiment 1, 2, 3, 4, and/or 5, wherein writes to the disk drive during the restore operation are based on the new mapping.

Embodiment 7. The method of embodiment 1, 2, 3, 4, 5, and/or 6, further comprising querying metrics to determine the wear scores, the metrics including a drive writes per day metric and/or a terabytes written metric.

Embodiment 8. The method of embodiment 1, 2, 3, 4, 5, 6, and/or 7, wherein generating the new mapping includes changing a mapping of volumes to disk drives such that the volumes are mapped to different disk drives in a manner configured to balance the wear pattern.

Embodiment 9. A method comprising: determining a wear pattern associated with disk drives of a storage system of a production system, wherein applications of the storage system write to volumes, each volume including one or more of the disk drives, wherein the volumes are mapped to sets of the disk drives, each set including at least one disk drive, generating a new mapping for the disk drives based on the wear pattern such that each of the volumes is mapped to a different set of disk drives, wherein the new mapping is configured to balance the wear pattern across all the disk drives of the storage system, wherein the wear pattern of each disk drive is based on corresponding metrics including a drive writes per day metric and/or a terabytes written metric, and performing a restore operation based on the new mapping by restoring a backup of the applications to the storage system.

Embodiment 10. The method of embodiment 9, further comprising generate a wear score for each of the disk drives and/or a volume wear score for each of the volumes.

Embodiment 11. The method of embodiment 9 and/or 10, wherein the new mapping maps volumes associated with highest wear scores to a set of disk drives having lowest wear scores.

Embodiment 12. The method of embodiment 9, 10, and/or 11, wherein the new mapping is configured to optimize a life of the storage system and/or a life of each of the disk drives.

Embodiment 13. A method for performing any of the operations, methods, or processes, or any portion of any of these, or any combination thereof disclosed herein.

Embodiment 14. A non-transitory storage medium having stored therein instructions that are executable by one or more hardware processors to perform operations comprising the operations of any one or more of embodiments 1-13.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, or agent may refer to software objects or routines that execute on the computing system. The different components, modules, engines, agents, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
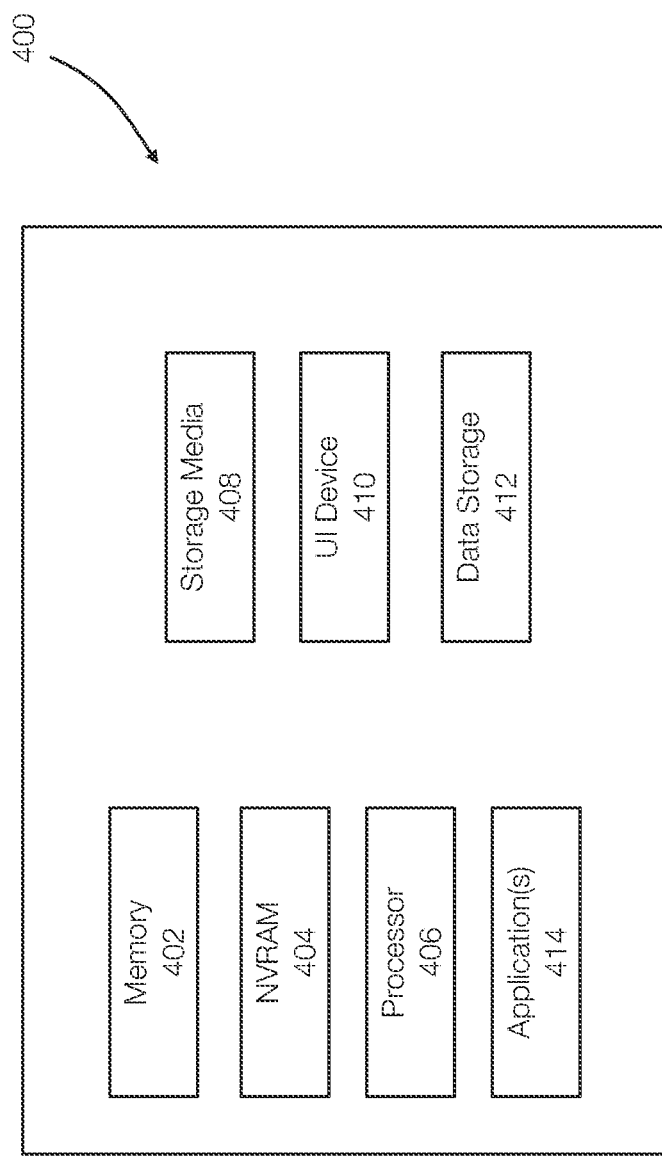
FIG. 4 discloses aspects of a computing device, system, or entity.

With reference briefly now to FIG. 4, any one or more of the entities disclosed, or implied, by the Figures and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid-state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
providing a production storage system comprising disk drives that are grouped into production volumes;
providing a backup storage system comprising disk drives that are configured to store backups of the production volumes;
determining a wear pattern associated with disk drives of the production volumes of the storage system based on one or more SMART metrics, wherein the wear pattern is learned by a data protection system during operation of the storage system as applications perform writes to the disk drives, wherein the writes are performed according to a mapping;
determining a volume wear score for each of the production volumes using the wear scores of the disk drives;
generating a new mapping for the production volumes to the disk drives by the data protection system based on the volume wear scores of the production volumes, wherein the new mapping is configured to balance the wear pattern associated with the writes performed by the applications across all the disk drives of the storage system, wherein the new mapping causes the production volumes to be associated with different disk drives compared to a previous mapping;
performing a recovery operation from the backups based on the new mapping; and
continuing operations of the applications using the new mapping of the disk drives to the production volumes.

2. The method of claim 1, further comprising determining the wear pattern for each of the disk drives based on a total number of writes and/or a total amount of data written.

3. The method of claim 2, further comprising determining the wear score for each of the disk drives based on the corresponding wear pattern.

4. The method of claim 3, further comprising generating the new mapping based on the wear scores of the disk drives.

5. The method of claim 4, wherein volumes mapped to disk drives with comparatively high wear scores are mapped in the new mapping to disk drives with comparatively low wear scores.

6. The method of claim 1, further comprising querying metrics to determine the wear scores, the metrics including a drive writes per day metric and/or a terabytes written metric.

7. The method of claim 1, wherein generating the new mapping includes changing a mapping of the production volumes to the disk drives such that the production volumes are mapped to different disk drives in a manner configured to balance the wear pattern.

8. A non-transitory storage medium having stored therein instructions that are executable by one or more hardware processors to perform operations comprising:
providing a production storage system comprising disk drives that are grouped into production volumes;
providing a backup storage system comprising disk drives that are configured to store backups of the production volumes;
determining a wear pattern associated with disk drives of the production volumes of the storage system based on one or more SMART metrics, wherein the wear pattern is learned by a data protection system during operation of the storage system as applications perform writes to the disk drives, wherein the writes are performed according to a mapping;
determining a volume wear score for each of the production volumes using the wear scores of the disk drives;
generating a new mapping for the production volumes to the disk drives by the data protection system based on the volume wear scores of the production volumes, wherein the new mapping is configured to balance the wear pattern associated with the writes performed by the applications across all the disk drives of the storage system, wherein the new mapping causes the production volumes to be associated with different disk drives compared to a previous mapping;
performing a recovery operation from the backups based on the new mapping; and
continuing operations of the applications using the new mapping of the disk drives to the production volumes.

9. The non-transitory storage medium of claim 8, further comprising determining the wear score for each of the disk drives and/or the volume wear score for each of the volumes.

10. The non-transitory storage medium of claim 9, wherein the new mapping maps the production volumes associated with highest wear scores to a set of disk drives having lowest wear scores.

11. The non-transitory storage medium of claim 8, wherein the new mapping is configured to optimize a life of the production storage system and/or a life of each of the disk drives in the production storage system.

* * * * *